United States Patent [19]
Dagan

[11] Patent Number: 6,058,575
[45] Date of Patent: May 9, 2000

[54] CABLE CLAMP

[76] Inventor: Gideon Dagan, 986 Vernon Ave., Venice, Calif. 90291

[21] Appl. No.: 09/327,433

[22] Filed: Jun. 7, 1999

[51] Int. Cl.[7] ...................................................... F16G 11/00
[52] U.S. Cl. .................. 24/136 R; 24/115 M; 24/135 A; 24/136 K; 24/136 L
[58] Field of Search .............................. 24/136 R, 136 K, 24/136 L, 135 A, 115 M

[56] References Cited

U.S. PATENT DOCUMENTS

| | | | |
|---|---|---|---|
| 296,160 | 4/1884 | Hill et al. ................................ | 24/136 R |
| 936,156 | 10/1909 | Parker ..................................... | 24/136 R |
| 2,443,155 | 6/1948 | Zahutnik ................................ | 24/136 L |
| 3,905,711 | 9/1975 | Rogers ................................... | 24/115 M |
| 4,313,243 | 2/1982 | Childress et al. ....................... | 24/136 K |
| 4,665,590 | 5/1987 | Udelhofen et al. .................... | 24/136 R |
| 4,939,821 | 7/1990 | Frank, Jr. ............................... | 24/136 R |
| 5,142,745 | 9/1992 | Setty et al. ............................. | 24/136 R |
| 5,244,422 | 9/1993 | Laricchia ................................ | 439/783 |
| 5,553,360 | 9/1996 | Lucas et al. ........................... | 24/136 R |

*Primary Examiner*—Victor N. Sakran
*Attorney, Agent, or Firm*—David A. Belasco; William H. Pavitt, Jr.; Natan Epstein

[57] ABSTRACT

A cable clamp may be constructed from a hollow body, a wedge-shaped member and a means for dislodging the member from the body. The body includes a tapered channel that is sized and shaped to accommodate the member and round, flat or rectangular cable sections. The means for dislodging the member include an aperture extending from one side of the member to the other, at least one cylindrical bearing surface positioned at the upper end of the body, and a camshaft. The camshaft has at least one cylindrical end with an inward facing end and an outward facing end. A cylindrical shaft in orthogonally and eccentrically mounted to the inward facing end. The camshaft is positioned so that the cylindrical shaft will bear against the inner surface of the aperture and the end portion will bear against the bearing surface. When the camshaft is rotated, the cylindrical shaft will cause the aperture and the wedge-shaped member to be displaced upwardly from the body. Standard means for rotating the camshaft include: standard screw slots, Phillips screw slots, hex nut connectors, Allen sockets, Torx sockets, and square socket connectors. In a variant, a separate, removable dislodging tool may replace the camshaft as may a captive camshaft that has only a single cylindrical end portion constrained within the upper end of the body. Other variants include means of attaching the body to objects, including wire bails, holes in the body and hooks. Means of connecting the member to the wire bail are provided.

10 Claims, 7 Drawing Sheets

CABLE CLAMP

FIELD OF INVENTION

The invention pertains to cable control and strain-relief devices. More particularly, the invention relates to cable clamps for use with cylindrical and flat or rectangular cross-section wires, cables and cords.

BACKGROUND OF THE INVENTION

Various types of cable clamping, control and strain-relief devices have been developed for use with power, telephone, cable television and other types of cables incorporating a number of different technologies. Similar devices have been developed for securing various types of cords for clothing, backpacks, sleeping bags, tents and other outdoor gear. U.S. Pat. No. 5,244,422 issued to Laricchia incorporates a C-shaped channel designed two accommodate a pair of cylindrical cables. The cables are arranged side-by-side in the channel and a wedge shaped member is introduced between the cables to force them apart and into the C-shaped channel, thereby securing one cable to the other.

U.S. Pat. No. 4,939,821 issued to Frank, Jr., sandwiches an insulated drop wire between a housing bail and an elongated pressure pad that is pressed by a slide wedge assembly against the pad. The pressure pad incorporates a side tab that fits an aperture in the wall of the housing bail to prevent the pad from dropping out of the open channel formed in the housing bail.

U.S. Pat. No. 5,142,745, issued to Setty et al. is similar to the Frank Jr. patent and adds a series of dimples or ridges along the lower surface of the pressure pad. This design also incorporates a side tab, adding small extensions to the tab that will project through the aperture in wall of the bail housing in a further attempt to keep the pieces of the cable clamp together as a unit. This is a particular problem for lineman working on ladders or lift trucks who may inadvertently drop pieces of the cable clamp.

U.S. Pat. No. 4,592,117 issued to Ruehl et al. is a cable clamp formed of plastic resin and designed to accommodate a main cable and two smaller, "messenger cables". The design incorporates cable channels that undulate longitudinally to form gripping surfaces for retaining the cables. This design is also composed of separate, unconnected pieces that may be easily dropped or lost. No simple means is provided for separating the clamp parts after they have been assembled to the cable.

U.S. Pat. No. 5,473,917 issued to Say describes a cable-type bicycle lock that employs a cam-like mechanism to control movement of the cable within the lock. While apparently effective, this design allows the cam surface to bear directly upon the cable, possibly distorting same.

While other variations exist, the above-described designs for cable clamping and control devices are typical of those encountered in the prior art. It is an objective of the present invention to provide a means to securely fasten a device to one or more cables, wires or cords so that they may be attached to a pole, building or other structure without undue strain on or damage to the cable components. It is a further objective to provide a cable clamping device in which all of the component parts are attached together so as to prevent loss of any of the pieces during assembly or removal of the clamp. It is a still further objective of the invention to provide a means to easily and safely remove the cable clamp from a cable after an extended period of time. It is a yet further objective to provide a cable clamp that may be secured from removal by unauthorized personnel. It is a yet another objective of the invention to provide a cable clamp that permits the cable section under tension to be introduced into the clamp from either side of the clamp. It is a still another objective of the invention to provide a clamp that may be attached to a cable for which neither end is available. It is a final objective to provide the above-described capabilities in an inexpensive and durable cable clamp that may be easily manufactured.

While some of the objectives of the present invention are disclosed in the prior art, none of the inventions found include all of the requirements identified.

SUMMARY OF THE INVENTION

The present invention addresses all of the deficiencies of prior cable clamps and satisfies all of the objectives described above.

A cable clamp providing the desired features may be constructed from a hollow body, a wedge-shaped member and a means for dislodging the wedge-shaped member from the hollow body. The body has an upper end, a lower end, a top surface and a tapered channel extending from the upper end to the lower end. The channel has a first side wall, a second side wall, a front wall and a back wall.

The wedge-shaped member has a top end, a bottom end, a front surface, a rear surface, first edge and a second edge. The member is sized and shaped to fit slidably within the tapered channel while permitting a first cable section to fit frictionally between the first edge and the first side wall and permitting a second cable section to fit frictionally between the second edge and the second side wall.

In use, the first and second cable sections are inserted between the first and second edges of the wedge-shaped member and the first and second side walls of the hollow body, respectively. When the first and second cable sections are then pulled toward the lower end of the hollow body, the wedge-shaped member urges the first and second cable sections toward the first and second side walls of the hollow body. This action secures the first and second cable sections within the hollow body.

In a variant of the invention, the means for dislodging the wedge-shaped member from the hollow body further includes the following components. First and second cylindrical bearing surfaces are provided. The bearing surfaces are located at the top surface of the hollow body adjacent the front wall and the back wall, respectively. An aperture is provided in the wedge-shaped member. The aperture has an interior surface and extends from the front surface of the wedge-shaped member to the rear surface of the member.

A camshaft is provided. The camshaft has first and second cylindrical end portions. Each of the end portions has an inward facing end and an outward facing end. A cylindrical shaft is eccentrically and orthogonally mounted between the inward facing ends. The camshaft is located within the aperture so that the cylindrical shaft may bear upon its interior surface. The first and second cylindrical end portions are sized and shaped to permit the camshaft to rotate upon the first and second cylindrical bearing surfaces. When the camshaft is so located, the cylindrical shaft will remain perpendicular to the front and back walls of the hollow body when the wedge-shaped member is located within the body. The second cylindrical end portion is sized to fit frictionally within the aperture. Means are provided for rotating the camshaft.

In use, the first and second cable sections are located between the first and second edges of the wedge-shaped member and the first and second side walls of the hollow body and the cable sections are secured there. The cable sections may be released from between the wedge-shaped member and the hollow body by turning the camshaft. This causes the cylindrical shaft to bear against the interior surface of the aperture and the first and second cylindrical end portions to bear against the first and second cylindrical bearing surfaces. This causes the wedge-shaped member to be displaced upwardly from the upper end of the hollow body thus increasing the clearance between the first and second edges of the wedge-shaped member and the first and second side walls of the hollow body. This loosens the cable clamp's grip on the first and second cable sections.

In yet another variant of the invention, the means for dislodging the wedge-shaped member from the hollow body further includes a locking detent. The detent comprises a section of the interior surface of the aperture of the wedge-shaped member. This section is located closest to the top end of the member and furthest from the center of the aperture.

When the cylindrical shaft of the camshaft is located within the detent and the shaft is located as close as possible to the upper end of the hollow body, the wedge-shaped member will be closest to the lower end of the hollow body and the cable sections will be most securely constrained within the cable clamp.

In yet a further variant, the means for dislodging the wedge-shaped member from the hollow body further includes a means for assembling and disassembling the camshaft to the wedge-shaped member. This means includes a relief groove. The groove extends from the front surface of the wedge-shaped member to the rear surface of the member and is located below and parallel to the inner surface of the aperture opposite the detent. An assembly slit is provided. The slit extends from the front surface of the wedge-shaped member to the rear surface of the member and connects the aperture to the relief groove.

To assemble the camshaft to the wedge-shaped member the second cylindrical portion of the camshaft is positioned upon the front surface of the wedge-shaped member adjacent the aperture. Pressure is then applied to the first cylindrical portion. This causes the assembly slit and the relief groove to permit the aperture to enlarge sufficiently to permit the second cylindrical portion to pass through the aperture. The camshaft may now be removed from the aperture only by reversing this procedure to press the second cylindrical portion out through the aperture.

In still another variant of the invention, the means for assembling and disassembling the camshaft to the wedge-shaped member further includes at least one retaining lug. The lug is affixed to the interior surface of the aperture. When the camshaft has been assembled to the wedge-shaped member the camshaft can not be removed from the member without the application of sufficient pressure to the second cylindrical portion of the camshaft. This causes the assembly slit and the relief groove to permit the aperture to enlarge sufficiently to allow the second cylindrical portion to pass through the aperture and past the retaining lug. This permits the camshaft to be disassembled from the wedge-shaped member.

In a further variant, the cable clamp includes means for securing the hollow body to an object for purposes of suspending the attached cable sections. In still a further variant, the means for securing the hollow body to an object comprises a wire bail secured to the hollow body. In yet another variant, the means for securing the hollow body to an object comprises at least one hole through the hollow body through which an attachment means may be secured.

In still another variant of the invention, the cable clamp further includes a means for removably securing the wedge-shaped member to wire bail. In still a further variant, the means for removably securing the wedge-shaped member to wire bail includes a retaining loop. The loop is affixed to the rear surface of the member adjacent its top end. The loop is sized, shaped, and located to permit the wire bail to fit slidably within the loop. A projecting finger is provided. The finger extends from the retaining loop toward the intersection of the rear surface and the top end so that the wire bail may fit frictionally between the finger and the intersection.

When the wire bail is passed between the projecting finger and the intersection of the rear surface and the top end of the wedge-shaped member, the member will be removably secured to wire bail. Likewise, the wedge-shaped member will be secured to the hollow body and positioned to be introduced into the tapered channel of the body.

In yet another variant of the cable clamp, the first and second side walls of the hollow body and the first and second edges of the wedge-shaped member are adapted to confine and secure a flat cable. In still a further variant of the invention, the first and second side walls of the hollow body and the first and second edges of the wedge-shaped member are adapted to confine and secure a round cable.

In yet a further variant, the means for rotating the camshaft further includes a standardized rotating means chosen from the group consisting of a standard screw slot, a Phillips screw slot, a hex head nut, an Allen head socket, a Torx drive and a square socket drive located upon at least one of the outward facing ends of the first and second cylindrical portions of the camshaft.

In still a further variant of the invention, the means for rotating the camshaft further includes a proprietary, non-standard rotating means located upon at least one of the outward facing ends of the first and second cylindrical portions of the camshaft.

In yet another variant, the means for dislodging the wedge-shaped member from the hollow body further includes at least one cylindrical bearing surface, the bearing surface is located at the top surface of the hollow body adjacent at least one of the front wall and the back wall. An aperture in the wedge-shaped member is provided. The aperture has an interior surface and extends from the front surface of the wedge-shaped member to the rear surface of the member. A removable dislodging tool is provided. The tool has a cylindrical end portion, the end portion has an inward facing end and an outward facing end, and a cylindrical shaft eccentrically and orthogonally mounted to the inward facing end, and a rotating means mounted to the outward facing end. The cylindrical end portion is sized and shaped to permit the dislodging tool to rotate upon the cylindrical bearing surface so that the cylindrical shaft may bear upon the interior surface of the aperture of the wedge-shaped member.

When the first and second cable sections are located between the first and second edges of the wedge-shaped member and the first and second side walls of the hollow body, the cable sections may be secured within the body. The cable sections may be released from between the wedge-shaped member and the hollow body by inserting the cylindrical shaft of the removable dislodging tool into the aperture of the wedge-shaped member. The cylindrical end portion may now rotate upon the cylindrical bearing surface while the tool is rotated. This causes the cylindrical shaft to bear against the interior surface of the aperture and causes the wedge-shaped member to be displaced upwardly from the upper end of the hollow body. This action increases the clearance between the first and second edges of the wedge-shaped member and the first and second side walls of the hollow body, thus loosening the cable clamp's grip on the first and second cable sections.

In yet another variant of the invention, the means for dislodging the wedge-shaped member from the hollow body further includes at least one cylindrical bearing track. The track is located adjacent the top surface of the hollow body adjacent one of the front wall and the back wall. An aperture is provided in the wedge-shaped member. The aperture has an interior surface and extends from the front surface of the wedge-shaped member to the rear surface of the member.

A camshaft is provided. The camshaft has at least one cylindrical end portion. The end portion has an inward facing end, an outward facing end, and a cylindrical shaft eccentrically and orthogonally mounted to the inward facing end. The camshaft is located within the aperture so that said cylindrical shaft may bear upon the interior surface of the aperture. The cylindrical end portion is rotatably constrained within the cylindrical bearing track while maintaining the cylindrical shaft perpendicular to the front and back walls of the hollow body when said wedge-shaped member is located within the body. Means for rotating the camshaft are provided.

In use, the first and second cable sections are located between the first and second edges of the wedge-shaped member and the first and second side walls of the hollow body and the cable sections are secured within the body. The cable sections may be released from between the wedge-shaped member and the hollow body by rotating the camshaft. This causes the cylindrical shaft to bear against the interior surface of the aperture and the cylindrical end portion to bear against the cylindrical bearing track. This action causes the wedge-shaped member to be displaced upwardly from the upper end of the hollow body thus increasing the clearance between the first and second edges of the wedge-shaped member and the first and second side walls of the hollow body. This loosens the cable clamp's grip on the first and second cable sections.

In a final variant a cable clamp may be constructed from a hollow body, a wedge-shaped member and a means for dislodging the wedge-shaped member from the hollow body. The body has an upper end, a lower end, a top surface and a tapered channel extending from the upper end to the lower end. The channel has a first side wall, a second side wall, a front wall and a back wall.

The wedge-shaped member has a top end, a bottom end, a front surface, a rear surface, first edge and a second edge. The member is sized and shaped to fit slidably within the tapered channel while permitting a cable section to fit frictionally between the second edge and the second side wall.

DESCRIPTION OF THE DRAWINGS

FIG. 12a is a cross-sectional view of the FIG. 12 embodiment taken along the line 12a—12a;

FIG. 13a is a cross-sectional view of the FIG. 12 embodiment taken along the line 13a—13a;

DETAILED DESCRIPTION OF THE PREFERRED EMBODIMENT

As illustrated in FIGS. 1–7, a cable clamp 10 providing the desired features may be constructed from a hollow body 14, a wedge-shaped member 18 and a means 22 for dislodging the wedge-shaped member 18 from the hollow body 14. As illustrated in FIG. 2a, the body 14 has an upper end 26, a lower end 30, a top surface 34 and a tapered channel 38 extending from the upper end 26 to the lower end 30. The channel 38 has a first side wall 42, a second side wall 46, a front wall 50 and a back wall 54.

Figures 1, 2, 9:
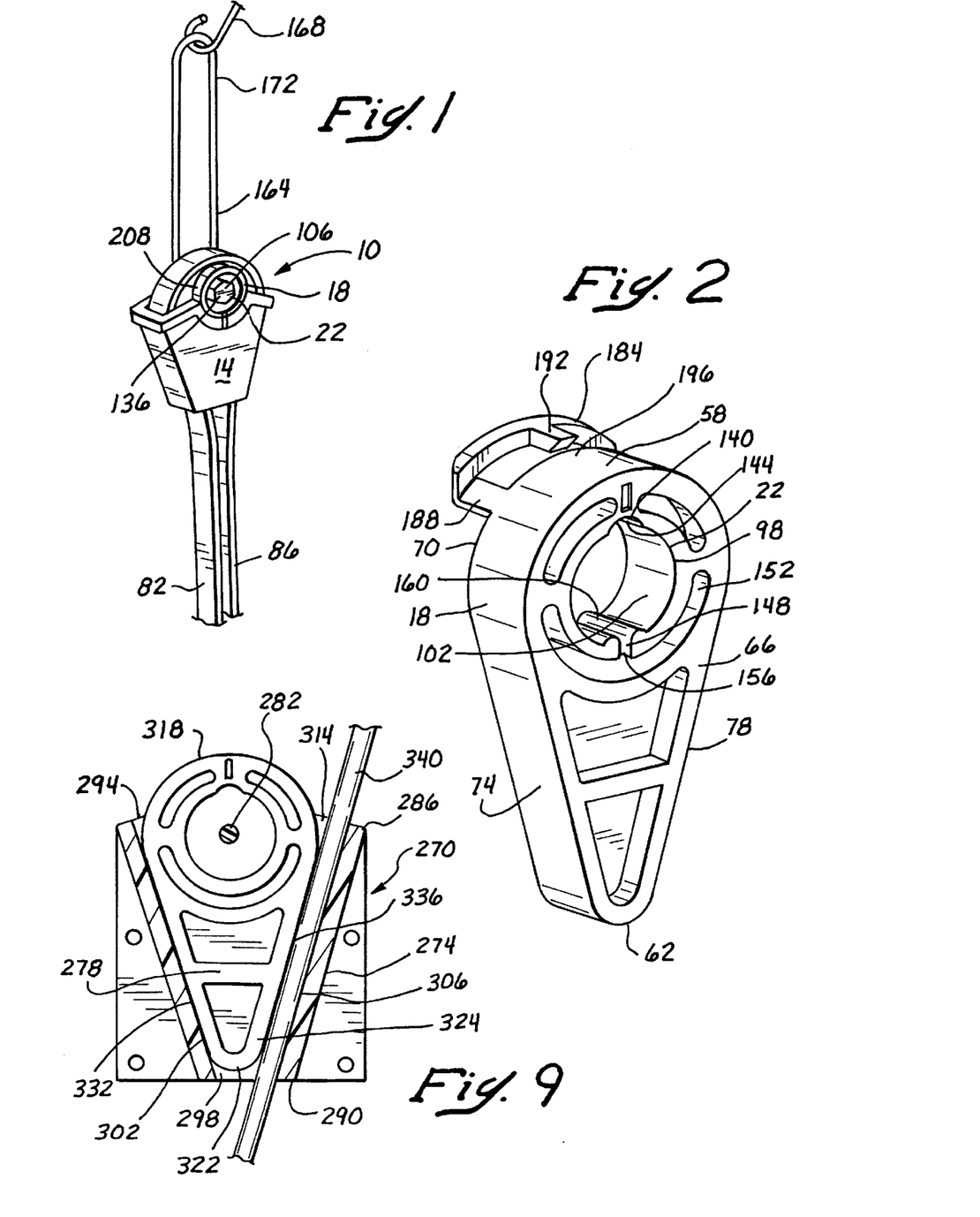
FIG. 1 is a perspective view of the preferred embodiment of the invention.
FIG. 2 is an enlarged perspective view of the wedge-shaped member 18.
FIG. 9 is a partial cross-sectional front elevation of another embodiment of the invention designed to clamp a single cable section.
Figures 1A, 2A:
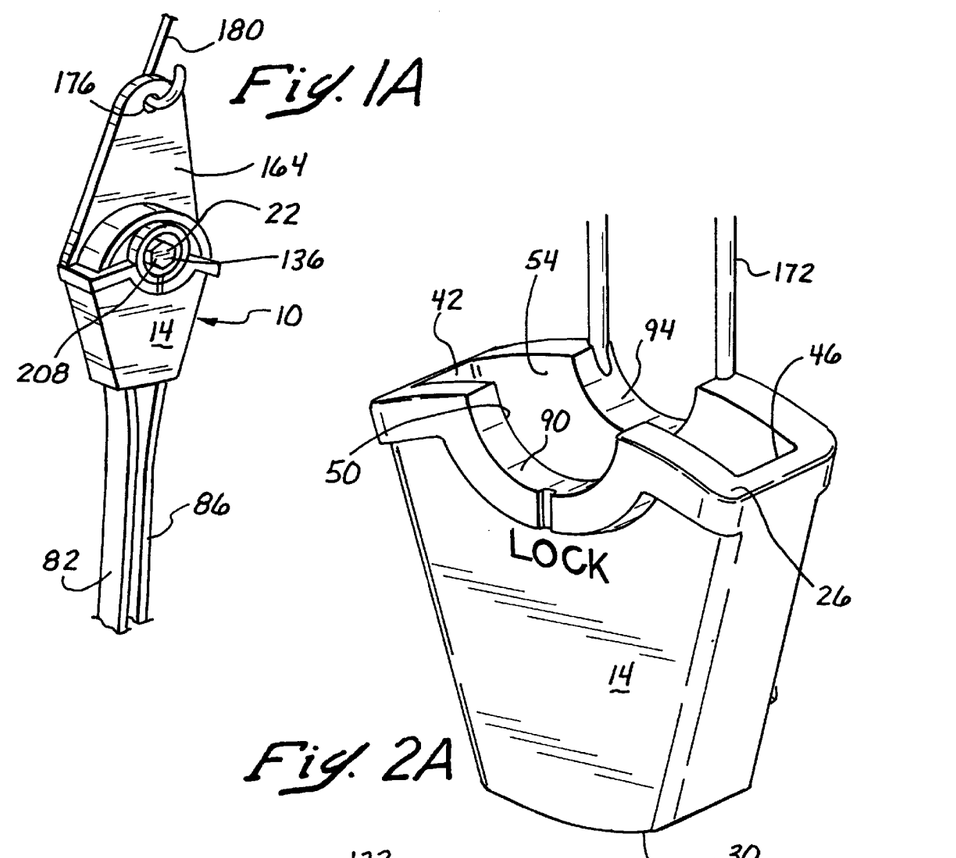
FIG. 1a is a perspective view of another embodiment of the invention incorporating an extension of the hollow body 14; having a hole for hanging the clamp.
FIG. 2a is an enlarged perspective view of the hollow body 14.
Figure 2B:
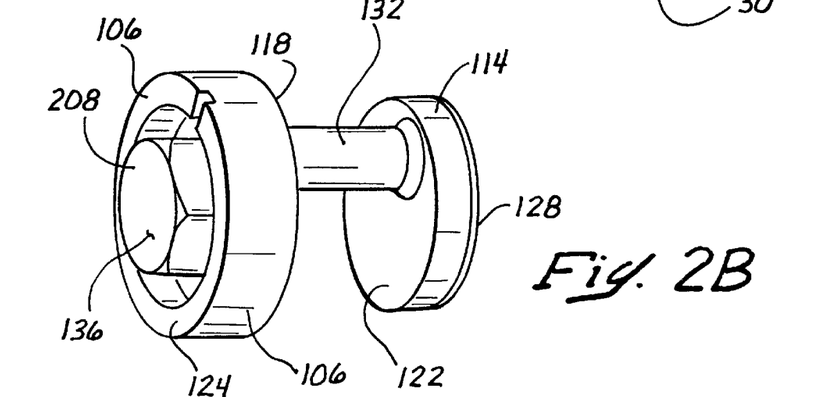
FIG. 2b is an enlarged perspective view of the means 22 for dislodging the wedge-shaped member 18 from the hollow body 14.

As illustrated in FIG. 2, the wedge-shaped member 18 has a top end 58, a bottom end 62, a front surface 66, a rear surface 70, first edge 74 and a second edge 78. As illustrated in FIGS. 3–6, the member 18 is sized and shaped to fit slidably within the tapered channel 38 while permitting a first cable section 82 to fit frictionally between the first edge 74 and the first side wall 42 and permitting a second cable section 86 to fit frictionally between the second edge 78 and the second side wall 46.

In use, the first 82 and second 86 cable sections are inserted between the first 74 and second 78 edges of the wedge-shaped member 18 and the first 42 and second 46 side walls of the hollow body 14, respectively. When the first 82 and second 86 cable sections are then pulled toward the lower end 30 of the hollow body 14, the wedge-shaped member 18 urges the first 82 and second 86 cable sections toward the first 42 and second 46 side walls of the hollow body 14. This action secures the first 82 and second 86 cable sections within the hollow body 14.

In a variant of the invention, the means 22 for dislodging the wedge-shaped member 18 from the hollow body 14 further includes the following components. First 90 and second 94 cylindrical bearing surfaces are provided. As illustrated in FIG. 2a, the bearing surfaces 90, 94 are located at the top surface 34 of the hollow body 14 adjacent the front wall 50 and the back wall 54, respectively. As illustrated in FIG. 2, an aperture 98 is provided in the wedge-shaped member 18. The aperture 98 has an interior surface 102 and extends from the front surface 66 of the wedge-shaped member 18 to the rear surface 70 of the member 18.

As illustrated in FIGS. 2b and 3–6, a camshaft 106 is provided. The camshaft 106 has first 110 and second 114 cylindrical end portions. Each of the end portions 110, 114 has an inward facing end 118, 122 and an outward facing end 124, 128. A cylindrical shaft 132 is eccentrically and orthogonally mounted between the inward facing ends 118, 122. As illustrated in FIGS. 3–6, the camshaft 106 is located within the aperture 98 so that the cylindrical shaft 132 may bear upon its interior surface 102. The first 110 and second 114 cylindrical end portions are sized and shaped to permit the camshaft 106 to rotate upon the first 90 and second 94 cylindrical bearing surfaces. When the camshaft 106 is so located, the cylindrical shaft 132 will remain perpendicular to the front 50 and back 54 walls of the hollow body 14 when the wedge-shaped member 18 is located within the body 14. The second cylindrical end portion 114 is sized to fit frictionally within the aperture 98. Means 136 are provided for rotating the camshaft 106.

Figure 3:
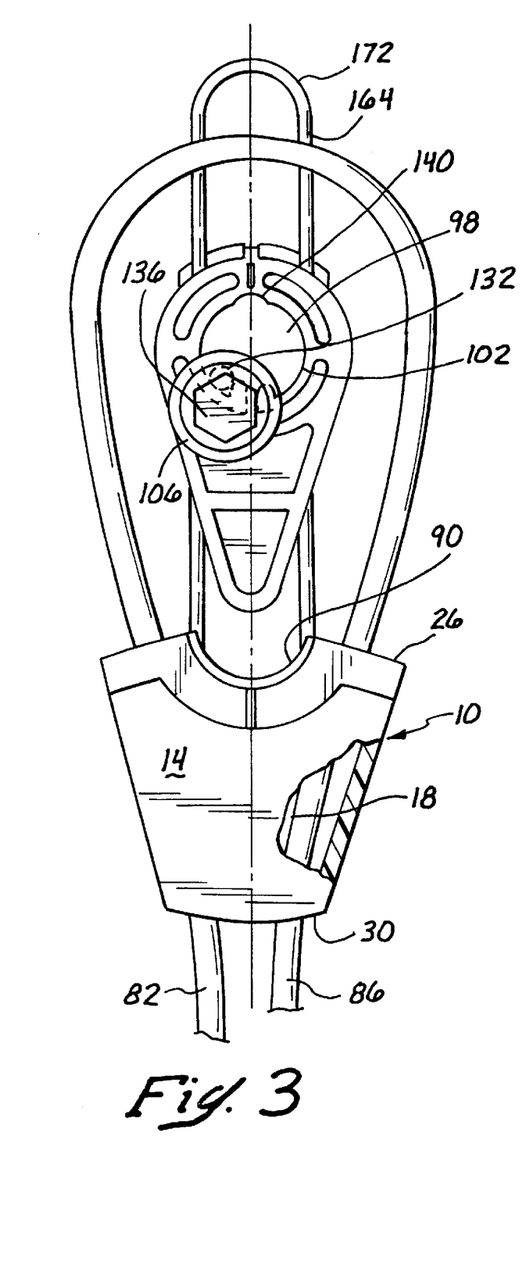
FIG. 3 is a partial cross-sectional front elevation of the FIG. 1 embodiment prior to attachment to a cable.
Figure 4:
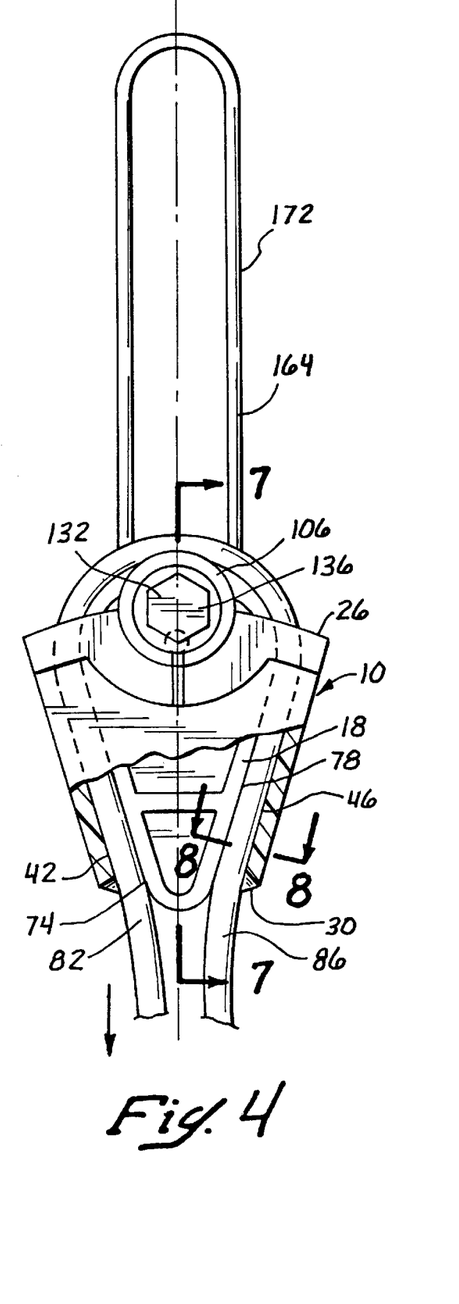
FIG. 4 is a partial cross-sectional front elevation of the FIG. 1 embodiment after attachment to a cable.
Figure 5:
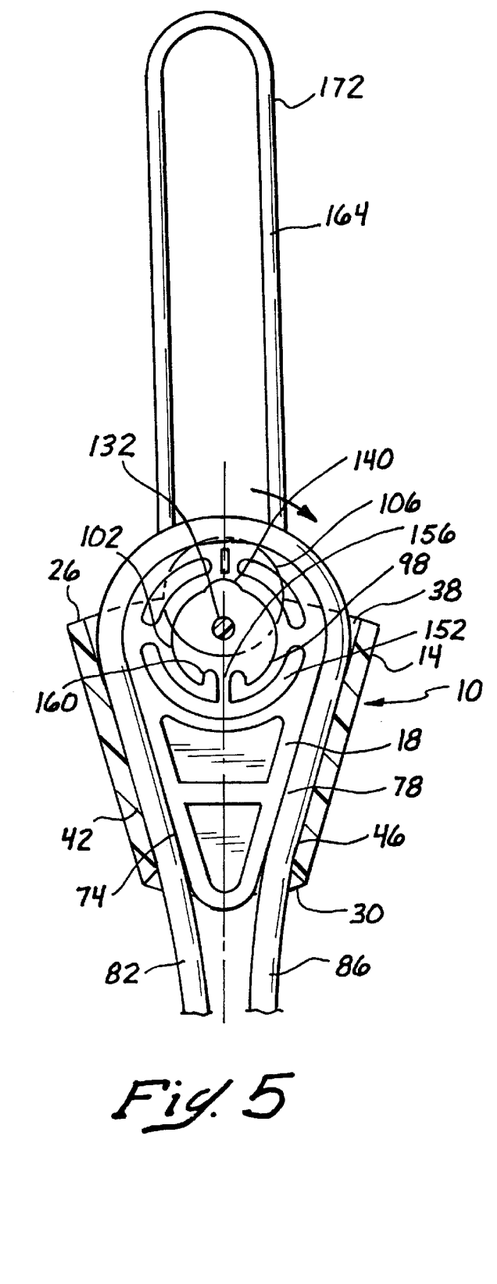
FIG. 5 is a cross-sectional view of the FIG. 1 embodiment illustrating the rotation of the camshaft 106.
Figure 6:
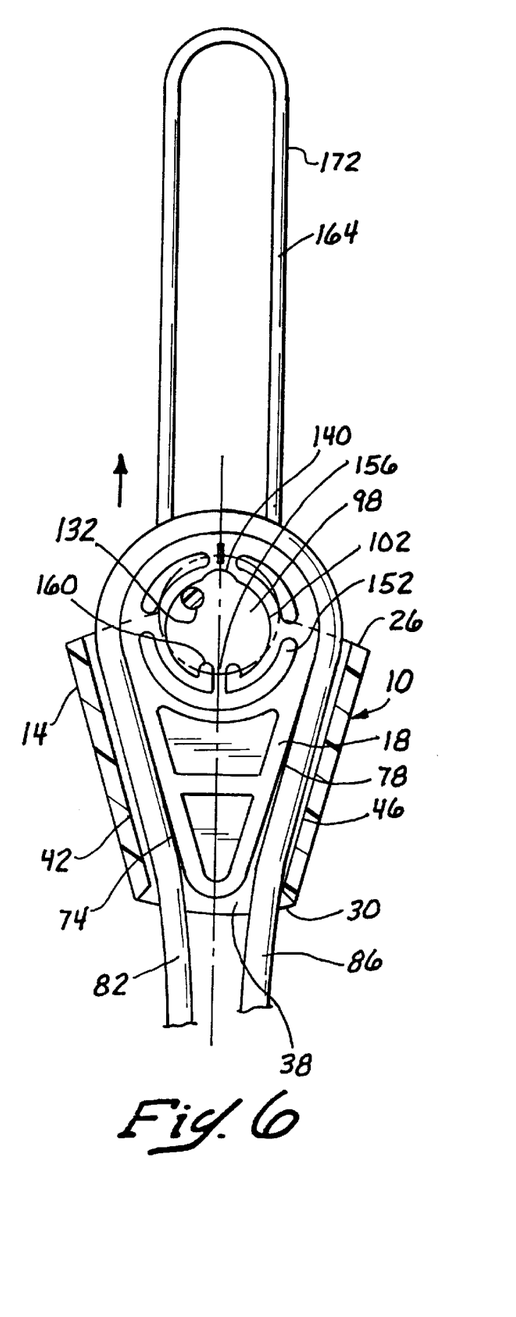
FIG. 6 is a cross-sectional view of the FIG. 1 embodiment illustrating the further rotation of the camshaft 106 and the loosening of the wedge-shaped member 18 from the hollow body 14.

As illustrated in FIGS. 3 and 4, the first 82 and second 86 cable sections are located between the first 74 and second 78 edges of the wedge-shaped member 18 and the first 42 and second 46 side walls of the hollow body 14 and the cable sections 82, 86 are secured there. As illustrated in FIGS. 5 and 6, the cable sections 82, 86 may be released from between the wedge-shaped member 18 and the hollow body 14 by turning the camshaft 106. This causes the cylindrical shaft 132 to bear against the interior surface 102 of the aperture 98 and the first 110 and second 114 cylindrical end portions to bear against the first 90 and second 94 cylindrical bearing surfaces. This causes the wedge-shaped member 18 to be displaced upwardly from the upper end 26 of the hollow body 14 thus increasing the clearance between the first 74 and second 78 edges of the wedge-shaped member 18 and the first 42 and second 46 side walls of the hollow body 14. This loosens the cable clamp's 10 grip on the first 82 and second 86 cable sections.

In yet another variant of the invention, illustrated in FIGS. 2, 3, 5 and 6, the means 22 for dislodging the wedge-shaped member 18 from the hollow body 14 further includes a locking detent 140. The detent 140 comprises a section 144 of the interior surface 102 of the aperture 98 of the wedge-shaped member 18. This section is located closest to the top end 58 of the member 18 and furthest from the center of the aperture 98.

When the cylindrical shaft 132 of the camshaft 106 is located within the detent 140 and the shaft 132 is located as close as possible to the upper end 26 of the hollow body, the wedge-shaped member 18 will be closest to the lower end 30 of the hollow body 14 and the cable sections 82, 86 will be most securely constrained within the cable clamp 10.

In yet a further variant, as illustrated in FIGS. 2, 5 and 6, the means 22 for dislodging the wedge-shaped member 18 from the hollow body 14 further includes a means 148 for assembling and disassembling the camshaft 106 to the wedge-shaped member 18. This means 148 includes a relief groove 152. The groove 152 extends from the front surface 66 of the wedge-shaped member 18 to the rear surface 70 of the member 18 and is located below and parallel to the inner surface 102 of the aperture 98 opposite the detent 140. An assembly slit 156 is provided. The slit 156 extends from the front surface 66 of the wedge-shaped member 18 to the rear surface 70 of the member 18 and connects the aperture 98 to the relief groove 152.

To assemble the camshaft 106 to the wedge-shaped member 18 the second cylindrical portion 114 of the camshaft 106 is positioned upon the front surface 66 of the wedge-shaped member 18 adjacent the aperture 98. Pressure is then applied to the first cylindrical portion 110. This causes the assembly slit 156 and the relief groove 152 to permit the aperture 98 to enlarge sufficiently to permit the second cylindrical portion 114 to pass through the aperture 98. The camshaft 106 may now be removed from the aperture 98 only by reversing this procedure to press the second cylindrical portion 114 out through the aperture 98.

In still another variant of the invention, as illustrated in FIGS. 2, 5 and 6, the means 148 for assembling and disassembling the camshaft 106 to the wedge-shaped member 18 further includes at least one retaining lug 160. The lug 160 is affixed to the interior surface 102 of the aperture 98. When the camshaft 106 has been assembled to the wedge-shaped member 18 the camshaft 106 can not be removed from the member 18 without the application of sufficient pressure to the second cylindrical portion 114 of the camshaft 106. This causes the assembly slit 156 and the relief groove 152 to permit the aperture 98 to enlarge sufficiently to allow the second cylindrical portion 114 to pass through the aperture 98 and past the retaining lug 160. This permits the camshaft 106 to be disassembled from the wedge-shaped member 18.

In a further variant, as illustrated in FIGS. 1, and 3–6, the cable clamp 10 includes means 164 for securing the hollow body 14 to an object 168 for purposes of suspending the attached cable 82, 86. In still a further variant, the means 164 for securing the hollow body 14 to an fixed object 168 comprises a wire bail 172 secured to the hollow body 14. In yet another variant, as illustrated in FIG. 1a, the means 164 for securing the hollow body 14 to an object 168 comprises at least one hole 176 through the hollow body 14 through which an attachment means 180 may be secured.

Figures 7, 8, 8A:
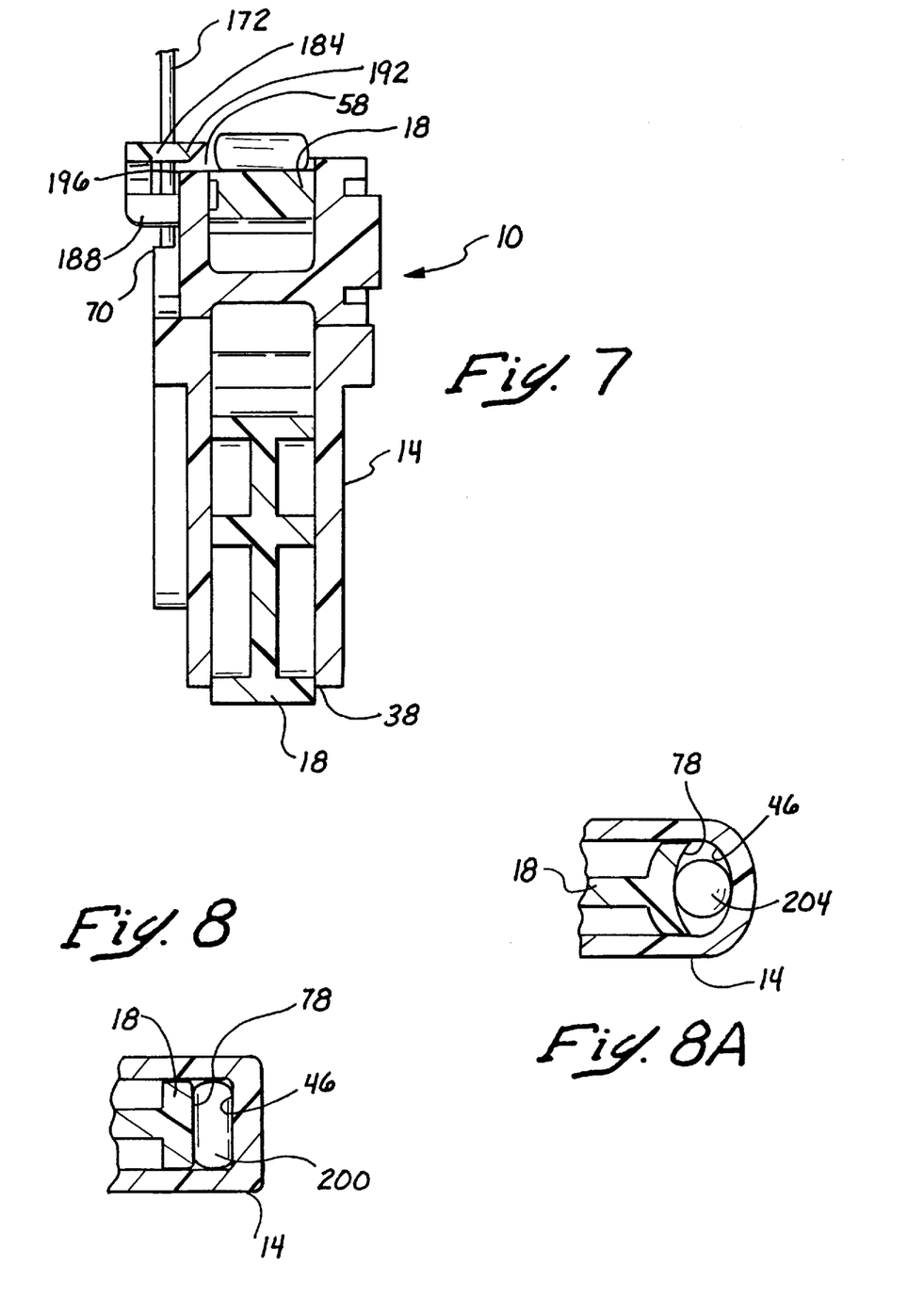
FIG. 7 is a cross-sectional view of the FIG. 1 embodiment taken along the line 7—7.
FIG. 8 is a partial cross-sectional view of the FIG. 1 embodiment taken along the line 8—8 illustrating the clamping of a flat cable.
FIG. 8a is a partial cross-sectional view of the FIG. 1 embodiment taken along the line 8—8 illustrating the clamping of a round cable.

In still another variant of the invention, illustrated by FIGS. 2 and 7, the cable clamp 10 further includes a means 184 for removably securing the wedge-shaped member 18 to wire bail 172. In still a further variant, also illustrated in FIGS. 2 and 7, the means 184 for removably securing the wedge-shaped member 18 to wire bail 172 includes a retaining loop 188. The loop 188 is affixed to the rear surface 70 of the member 18 adjacent its top end 58. The loop 188 is sized, shaped, and located to permit the wire bail 172 to fit slidably within the loop 188. A projecting finger 192 is provided. The finger 192 extends from the retaining loop 188 toward the intersection 196 of the rear surface 70 and the top end 58 so that the wire bail 172 may fit frictionally between the finger 192 and the intersection 196.

When the wire bail 172 is passed between the projecting finger 192 and the intersection 196 of the rear surface 70 and the top end 58 of the wedge-shaped member 18, the member 18 will be removably secured to wire bail 172. Likewise, the wedge-shaped member 18 will be secured to the hollow body 14 and positioned to be introduced into the tapered channel 38 of the body 14.

In yet another variant of the cable clamp 10, as illustrated in FIG. 8, the first 42 and second 46 side walls of the hollow body 14 and the first 74 and second 78 edges shaped member 18 are adapted to confine and secure a flat cable 200. In still a further variant of the invention, as illustrated in FIG. 8a, the first 42 and second 46 side walls of the hollow body 14 and the first 74 and second 78 edges of the wedge-shaped member 18 are adapted to confine and secure a round cable 204.

In yet a further variant, the means 136 for rotating the camshaft 106 further includes a standardized rotating means 208 chosen from the group consisting of a standard screw slot, a Phillips screw slot, a hex head nut (FIGS. 1, 1a, 2b, 3 and 4), an Allen head socket, a Torx drive and a square socket drive located upon at least one of the outward facing ends 124, 128 of the first 110 and second 114 cylindrical portions of the camshaft 106.

Figures 10, 10A, 10B, 10C, 11:
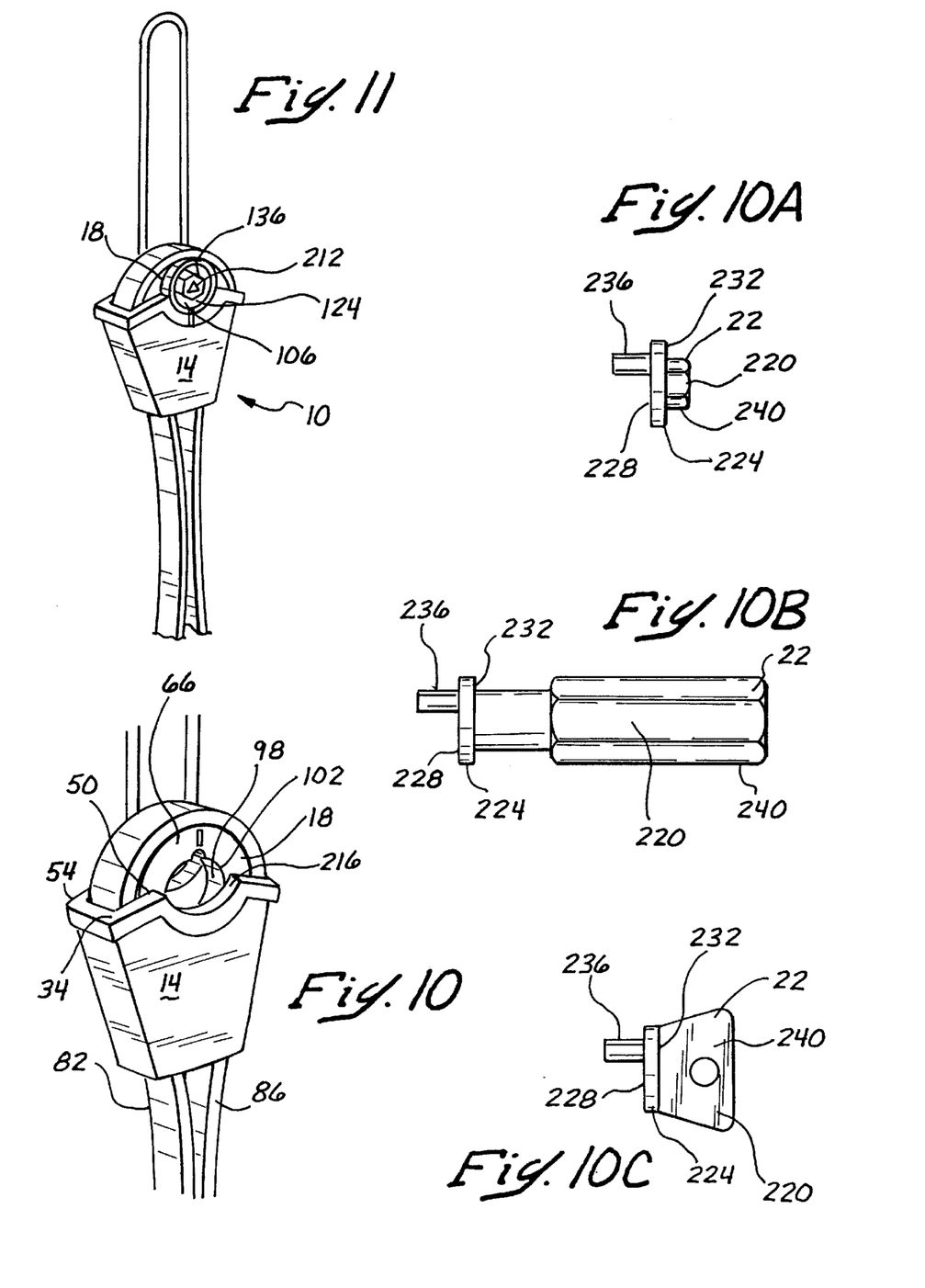
FIG. 10 is a perspective view of another embodiment of the invention designed for use with an external dislodging tool.
FIG. 10a is a side elevational view of a dislodging tool.
FIG. 10b is a side elevational view of another dislodging tool.
FIG. 10c is a side elevational view of yet another dislodging tool.
FIG. 11 is a perspective view of the FIG. 1 embodiment including a proprietary, non-standard rotating means 212 for rotating the camshaft 106.
Figure 12:
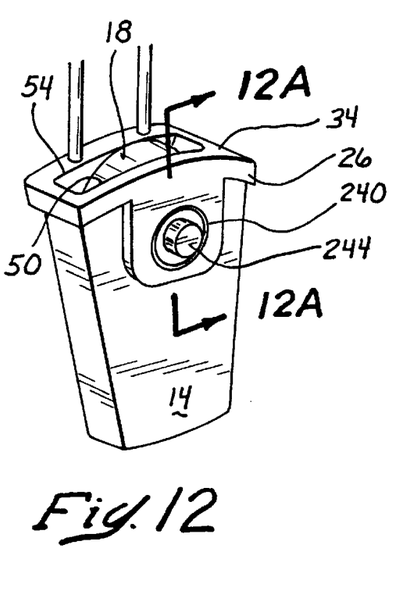
FIG. 12 is a perspective view of the another embodiment including a cylindrical track 240 constraining the camshaft 244 where the camshaft is supported by one cylindrical end portion 250.
Figure 12A:
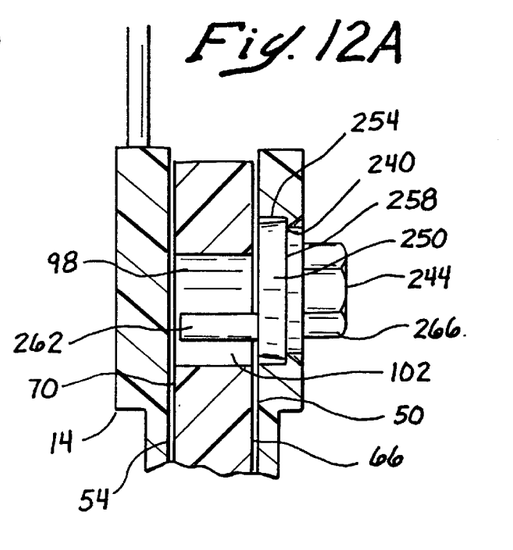
Figure 13:
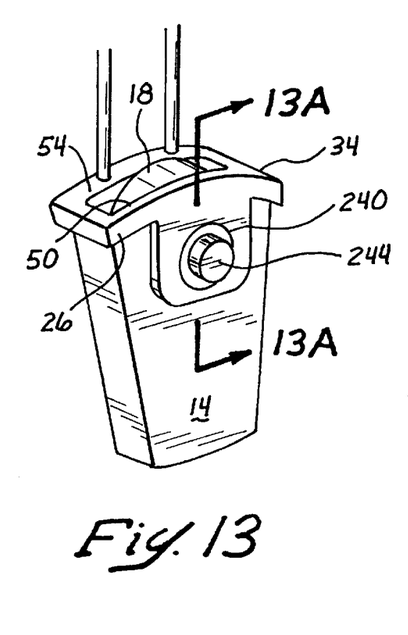
FIG. 13 is a perspective view of the another embodiment including a cylindrical track 240 constraining the camshaft 244 where the camshaft is supported by two cylindrical end portions 250.
Figure 13A:
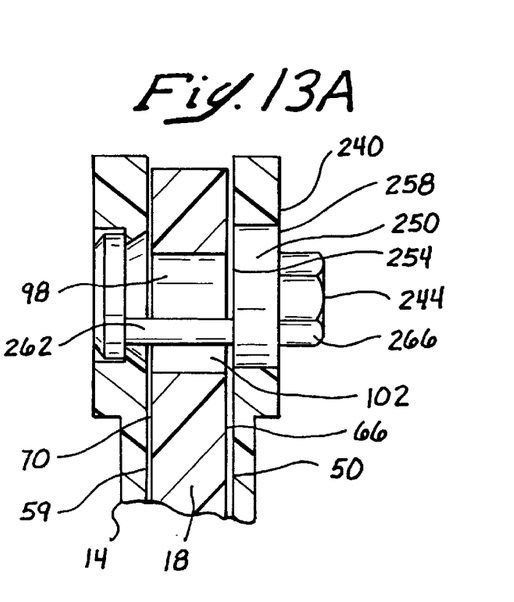

In still a further variant of the invention, illustrated by FIG. 11, the means 136 for rotating the camshaft 106 further includes a proprietary, non-standard rotating means 212 located upon at least one of the outward facing ends 124, 128 of the first 110 and second 114 cylindrical portions of the camshaft 106.

In yet another variant, illustrated by FIGS. 10, 10a, 10b and 10c, the means 22 for dislodging the wedge-shaped member 18 from the hollow body 14 further includes at least one cylindrical bearing surface 216, the bearing surface 216 is located at the top surface 34 of the hollow body 14 adjacent at least one of the front wall 50 and the back wall 54. An aperture 98 in the wedge-shaped member 18 is provided. The aperture 98 has an interior surface 102 and extends from the front surface 66 of the wedge-shaped member 18 to the rear surface 70 of the member 18. A removable dislodging tool 220 is provided. The tool 220 has a cylindrical end portion 224, the end portion 224 has an inward facing end 228 and an outward facing end 232, and a cylindrical shaft 236 eccentrically and orthogonally mounted to the inward facing 228 end, and a rotating means 240 mounted to the outward facing end 232. The cylindrical end portion 224 is sized and shaped to permit the dislodging tool 220 to rotate upon the cylindrical bearing surface 216 so that the cylindrical shaft 236 may bear upon the interior surface 102 of the aperture 98 of the wedge-shaped member 18.

When the first 82 and second 86 cable sections are located between the first 74 and second 78 edges of the wedge-shaped member 18 and the first 42 and second 46 side walls of the hollow body 14, the cable sections 82, 86 may be secured within the body 14. The cable sections 82, 86 may be released from between the wedge-shaped member 18 and the hollow body 14 by inserting the cylindrical shaft 236 of the removable dislodging tool 220 into the aperture 98 of the wedge-shaped member 18. The cylindrical end portion 224 may now rotate upon the cylindrical bearing surface 216 while the tool 220 is rotated. This causes the cylindrical shaft 236 to bear against the interior surface 102 of the aperture 98 and causes the wedge-shaped member 18 to be displaced upwardly from the upper end 26 of the hollow body 14. This action increases the clearance between the first 74 and second 78 edges of the wedge-shaped member 18 and the first 42 and second 46 side walls of the hollow body 14, thus loosening the cable clamp's 10 grip on the first 82 and second 86 cable sections.

In yet another variant of the invention, illustrated by FIGS. 12, 12a, 13 and 13a, the means 22 for dislodging the wedge-shaped member 18 from the hollow body 14 further includes at least one cylindrical bearing track 240. The track 240 is located adjacent the top surface 34 of the hollow body 14 adjacent one of the front wall 50 and the back wall 54. An aperture 98 is provided in the wedge-shaped member 18. The aperture 98 has an interior surface 102 and extends from the front surface 66 of the wedge-shaped member 18 to the rear surface 70 of the member 18.

A camshaft 244 is provided. The camshaft 244 has at least one cylindrical end portion 250. The end portion 250 has an inward facing end 254, an outward facing end 258, and a cylindrical shaft 262 eccentrically and orthogonally mounted to the inward facing end 254. The camshaft 244 is located within the aperture 98 so that said cylindrical shaft 262 may bear upon the interior surface 102 of the aperture 98. The cylindrical end portion 250 is rotatably constrained within the cylindrical bearing track 240 while maintaining the cylindrical shaft 262 perpendicular to the front 50 and back 54 walls of the hollow body 14 when said wedge-shaped member 18 is located within the body 14. Means 266 for rotating the camshaft 244 are provided.

In use, the first 82 and second 86 cable sections (not shown) are located between the first 74 and second 78 edges of the wedge-shaped member 18 and the first 42 and second 46 side walls of the hollow body 14 and the cable sections 82, 86 are secured within the body 14. The cable sections 82, 86 may be released from between the wedge-shaped member 18 and the hollow body 14 by rotating the camshaft 244. This causes the cylindrical shaft 262 to bear against the interior surface 102 of the aperture 98 and the cylindrical end portion 250 to bear against the cylindrical bearing track 240. This action causes the wedge-shaped member 18 to be displaced upwardly from the upper end 26 of the hollow body 14 thus increasing the clearance between the first 74 and second 78 edges of the wedge-shaped member 18 and the first 42 and second 46 side walls of the hollow body 14. This loosens the cable clamp's 10 grip on the first 82 and second 86 cable sections.

In a final variant, illustrated by FIG. 9, a cable clamp 270 may be constructed from a hollow body 274, a wedge-shaped member 278 and a means 282 for dislodging the wedge-shaped member 278 from the hollow body 274. The body 274 has an upper end 286, a lower end 290, a top surface 294 and a tapered channel 298 extending from the upper end 286 to the lower end 290. The channel 298 has a first side wall 302, a second side wall 306, a front wall not shown) and a back wall 314.

The wedge-shaped member 278 has a top end 318, a bottom end 322, a front surface 324, a rear surface (not shown), first edge 332 and a second edge 336. The member 278 is sized and shaped to fit slidably within the tapered channel 298 while permitting a cable section 340 to fit frictionally between the second edge 336 and the second side wall 306.

The cable clamp 10 has been described with reference to particular embodiments. Other modifications and enhancements can be made without departing from the spirit and scope of the claims that follow.

What is claimed is:

1. A cable clamp, comprising:

a hollow body, said body having an upper end, a lower end, a top surface and a tapered channel extending from said upper end to said lower end, said channel having a first side wall, a second side wall, a front wall and a back wall;

a wedge-shaped member, said member having a top end, a bottom end, a front surface, a rear surface, first edge and a second edge and being sized and shaped to fit slidably within said tapered channel while permitting a first cable section to fit frictionally between said first edge and said first side wall and permitting a second cable section to fit frictionally between said second edge and said second side wall;

means for dislodging said wedge-shaped member from said hollow body;

whereby, when the first and second cable sections are disposed between the first and second edges of the wedge-shaped member and the first and second side walls of the hollow body, respectively, and the first and second cable sections are pulled toward the lower end of the hollow body, the wedge-shaped member will urge the first and second cable sections toward the first and second side walls of the hollow body, respectively, thereby securing the first and second cable sections within the hollow body;

said means for dislodging said wedge-shaped member from said hollow body comprising:

first and second bearing surfaces, said bearing surfaces disposed at the top surface of the hollow body adjacent the front wall and the back wall, respectively;

an aperture, said aperture having an interior surface and extending from the front surface of the wedge-shaped member to the rear surface of the member;

a camshaft, said camshaft having first and second end portions, each of said end portions having an inward facing end and an outward facing end, a shaft eccentrically and orthogonally mounted between said inward facing ends;

said camshaft disposed within said aperture so that said shaft may bear upon said interior surface;

said first and second end portions being sized and shaped to permit the cam shaft to rotate upon the first and second bearing surfaces while maintaining the shaft perpendicular to the front and back walls of the hollow body when said wedge-shaped member is disposed therewithin;

said second end portion sized to fit frictionally within said aperture;

means for rotating said camshaft; and whereby, when the first and second cable sections are disposed between the first and second edges of the wedge-shaped member and the first and second side walls of the hollow body and the cable sections are secured therein, the cable sections may be released from between the wedge-shaped member and the hollow body by turning the camshaft, thereby causing the shaft to bear against the interior surface of the aperture and the first and second end portions to bear against the first and second bearing surfaces, thereby causing the wedge-shaped member to be displaced upwardly from the upper end of the hollow body thus increasing the clearance between the first and second edges of the wedge-shaped member and the first and second side walls of the hollow body, thereby loosening the cable clamp's grip on the first and second cable sections.

2. A cable clamp as described in claim 1, wherein the means for dislodging said wedge-shaped member from the hollow body further comprises:

a locking detent, said detent comprising a section of the interior surface of the aperture of the wedge-shaped member, said section disposed closest to the top end of the member and furthest from the center of the aperture; and whereby, when the cylindrical shaft of the camshaft is disposed within the detent and said shaft is disposed as close as possible to the upper end of the hollow body, the wedge-shaped member will be closest to the lower end of the hollow body and the cable sections will be most securely constrained within the cable clamp.

3. A cable clamp as described in claim 2, wherein the means for dislodging said wedge-shaped member from the hollow body further comprises:

a means for assembling and disassembling the camshaft to the wedge-shaped member, said means comprising:

a relief groove, said groove extending from the front surface of the wedge-shaped member to the rear surface of the member and being disposed below and parallel to the inner surface of the aperture opposite the detent;

an assembly slit, said slit extending from the front surface of the wedge-shaped member to the rear surface of the member and connecting the aperture to the relief groove; and whereby, when the second cylindrical portion of the camshaft is positioned upon the front surface of the wedge-shaped member adjacent the aperture and pressure is applied to the first cylindrical portion, the assembly slit and the relief groove will permit the aperture to enlarge sufficiently to permit the second cylindrical portion to pass through the aperture, thereby assembling the camshaft to the wedge-shaped member.

4. The means for assembling and disassembling the camshaft to the wedge-shaped member as described in claim 3, further comprising:

at least one retaining lug, said lug affixed to the interior surface of the aperture; and whereby, when the camshaft has been assembled to the wedge-shaped member the camshaft can not be removed from said member without the application of sufficient pressure to the second cylindrical portion of the camshaft to cause the assembly slit and the relief groove to permit the aperture to enlarge sufficiently to permit the second cylindrical portion to pass through the aperture and past the retaining lug, thereby disassembling the camshaft from the wedge-shaped member.

5. A cable clamp as described in claim 1, further comprising a wire bail secured to the hollow body and further comprising means for means for removably securing the wedge-shaped member to the wire bail, said means comprising:

a retaining loop, said loop affixed to the rear surface of the member adjacent the top end;

said loop being sized, shaped, and disposed to permit the wire bail to fit slidably therethrough;

a projecting finger, said finger extending from the retaining loop toward the intersection of the rear surface and the top end so that the wire bail may fit frictionally between said finger and said intersection; and whereby, when the wire bail is passed between the projecting finger and the intersection of the rear surface and the top end of the wedge-shaped member, the member will be removably secured to wire bail and thus to the hollow body and positioned to be introduced into the tapered channel of the body.

6. A cable clamp as described in claim as described in claim 1, wherein the means for rotating the camshaft further comprises a standardized rotating means chosen from the group consisting of a standard screw slot, a philips screw slot, a hex head nut, an alien head socket, a Torx drive and a square socket drive disposed upon at least one of the outward facing ends of the first and second cylindrical portions of the camshaft.

7. A cable clamp as described in claim as described in claim 1, wherein the means for rotating the camshaft further comprises a proprietary, non-standard rotating means disposed upon at least one of the outward facing ends of the first and second cylindrical portions of the camshaft.

8. A cable clamp, comprising:
   a hollow body, said body having an upper end, a lower end, a top surface and a tapered channel extending from said upper end to said lower end, said channel having a first side wall, a second side wall, a front wall and a back wall;
   a wedge-shaped member, said member having a top end, a bottom end, a front surface, a rear surface, first edge and a second edge and being sized and shaped to fit slidably within said tapered channel while permitting a first cable section to fit frictionally between said first edge and said first side wall and permitting a second cable section to fit frictionally between said second edge and said second side wall;
   means for dislodging said wedge-shaped member from said hollow body;
   whereby, when the first and second cable sections are disposed between the first and second edges of the wedge-shaped member and the first and second side walls of the hollow body, respectively, and the first and second cable sections are pulled toward the lower end of the hollow body, the wedge-shaped member will urge the first and second cable sections toward the first and second side walls of the hollow body, respectively, thereby securing the first and second cable sections within the hollow body;
   said means for dislodging said wedge-shaped member from said hollow body further comprising:
      at least one bearing surface, said bearing surface disposed at the top surface of the hollow body adjacent at least one of the front wall and the back wall;
      an aperture, said aperture having an interior surface and extending from the front surface of the wedge-shaped member to the rear surface of the member;
      a removable dislodging tool, said tool having an end portion, said end portion having an inward facing end and an outward facing end, a shaft eccentrically and orthogonally mounted to the inward facing end, and a rotating means mounted to the outward facing end;
      said end portion being sized and shaped to permit the dislodging tool to rotate upon the bearing surface so that said shaft may bear upon said interior surface of the aperture of the wedge-shaped member; and
      whereby, when the first and second cable sections are disposed between the first and second edges of the wedge-shaped member and the first and second side walls of the hollow body and the cable sections are secured therein, the cable sections may be released from between the wedge-shaped member and the hollow body by inserting the shaft of the removable dislodging tool into the aperture of the wedge-shaped member so that the end portion may rotate upon the bearing surface and rotating the tool, thereby causing the shaft to bear against the interior surface of the aperture, thereby causing the wedge-shaped member to be displaced upwardly from the upper end of the hollow body thus increasing the clearance between the first and second edges of the wedge-shaped member and the first and second side walls of the hollow body, thereby loosening the cable clamp's grip on the first and second cable sections.

9. A cable clamp, comprising:
   a hollow body, said body having an upper end, a lower end, a top surface and a tapered channel extending from said upper end to said lower end, said channel having a first side wall, a second side wall, a front wall and a back wall;
   a wedge-shaped member, said member having a top end, a bottom end, a front surface, a rear surface, first edge and a second edge and being sized and shaped to fit slidably within said tapered channel while permitting a first cable section to fit frictionally between said first edge and said first side wall and permitting a second cable section to fit frictionally between said second edge and said second side wall;
   means for dislodging said wedge-shaped member from said hollow body;
   whereby, when the first and second cable sections are disposed between the first and second edges of the wedge-shaped member and the first and second side walls of the hollow body, respectively, and the first and second cable sections are pulled toward the lower end of the hollow body, the wedge-shaped member will urge the first and second cable sections toward the first and second side walls of the hollow body, respectively, thereby securing the first and second cable sections within the hollow body;
   said means for dislodging said wedge-shaped member from the hollow body further comprising:
      at least one bearing track, said track disposed adjacent the top surface of the hollow body adjacent one of the front wall and the back wall;
      an aperture, said aperture having an interior surface and extending from the front surface of the wedge-shaped member to the rear surface of the member;
      a camshaft, said camshaft having at least one end portion, said end portion having an inward facing end, an outward facing end, and a shaft eccentrically and orthogonally mounted to the inward facing end;
      said camshaft disposed within said aperture so that said shaft may bear upon said interior surface;
      said end portion rotatably constrained within the bearing track while maintaining the shaft perpendicular to the front and back walls of the hollow body when said wedge-shaped member is disposed therewithin;
      means for rotating said camshaft; and
      whereby, when the first and second cable sections are disposed between the first and second edges of the wedge-shaped member and the first and second side walls of the hollow body and cable sections are secured therein, the cable sections may be released from between the wedge-shaped member and the hollow body by rotating the camshaft, thereby causing the shaft to bear against the interior surface of the aperture and the end portion to bear against the cylindrical bearing track, thereby causing the wedge-shaped member to be displaced upwardly from the upper end of the hollow body thus increasing the clearance between the first and second edges of the wedge-shaped member and the first and second side walls of the hollow body, thereby loosening the cable clamp's grip on the first and second cable section.

10. A cable clamp, comprising:

a hollow body, said body having an upper end, a lower end, a top surface and a tapered channel extending from said upper end to said lower end, said channel having a first side wall, a second side wall, a front wall and a back wall;

a wedge-shaped member, said member having a top end, a bottom end, a front surface, a rear surface, first edge and a second edge and being sized and shaped to fit slidably within said tapered channel while permitting a cable section to fit frictionally between said second edge and said second side wall;

means for dislodging said wedge-shaped member from said hollow body; and whereby, when the cable section is disposed between the second edge of the wedge-shaped member and the second side wall of the hollow body, and the cable section is pulled toward the lower end of the hollow body, the wedge-shaped member will urge the cable section toward the second side wall of the hollow body, thereby securing the cable section within the hollow body;

said means for dislodging said wedge-shaped member from the hollow body further comprising:

first and second bearing surfaces, said bearing surfaces disposed at the top surface of the hollow body adjacent the front wall and the back wall, respectively;

an aperture, said aperture having an interior surface and extending from the front surface of the wedge-shaped member to the rear surface of the member;

a camshaft, said camshaft having first and second end portions, each of said end portions having an inward facing end and an outward facing end, a shaft eccentrically and orthogonally mounted between said inward facing ends;

said camshaft disposed within said aperture so that said shaft may bear upon said interior surface;

said first and second end portions being sized and shaped to permit the cam shaft to rotate upon the first and second bearing surfaces while maintaining the cylindrical shaft perpendicular to the front and back walls of the hollow body when said wedge-shaped member is disposed therewithin;

said second end portion sized to fit frictionally within said aperture;

means for rotating said camshaft; and whereby, when the cable section is disposed between the second edge of the wedge-shaped member and the second side wall of the hollow body and the cable section is secured therein, the cable section may be released from between the wedge-shaped member and the hollow body by turning the camshaft, thereby causing the shaft to bear against the interior surface of the aperture and the first and second end portions to bear against the first and second bearing surfaces, thereby causing the wedge-shaped member to be displaced upwardly from the upper end of the hollow body thus increasing the clearance between the second edge of the wedge-shaped member and the second side wall of the hollow body, thereby loosening the cable clamp's grip on the cable section.

\* \* \* \* \*